United States Patent
Fujimura et al.

(10) Patent No.: US 9,618,660 B2
(45) Date of Patent: Apr. 11, 2017

(54) INFRARED IMAGING SYSTEM

(71) Applicants: NALUX CO., LTD., Osaka-shi, Osaka (JP); FLIR Systems, Inc., Wilsonville, OR (US)

(72) Inventors: Kayoko Fujimura, Osaka (JP); Katsumoto Ikeda, Osaka (JP); Daisuke Seki, Osaka (JP)

(73) Assignees: NALUX CO., LTD. (JP); FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/621,588

(22) Filed: Feb. 13, 2015

(65) Prior Publication Data
US 2015/0206909 A1 Jul. 23, 2015

Related U.S. Application Data

(63) Continuation-in-part of application No. PCT/JP2013/073663, filed on Sep. 3, 2013.

(60) Provisional application No. 61/696,872, filed on Sep. 5, 2012.

(51) Int. Cl.
G02B 3/04 (2006.01)
G02B 13/14 (2006.01)
G02B 3/08 (2006.01)

(52) U.S. Cl.
CPC ............... G02B 3/04 (2013.01); G02B 13/14 (2013.01); G02B 3/08 (2013.01)

(58) Field of Classification Search
CPC ...... G02B 13/008; G02B 13/14; G02B 13/18; G02B 3/04
See application file for complete search history.

(56) References Cited

U.S. PATENT DOCUMENTS

| 2009/0067041 A1* | 3/2009 | Izumi | G02B 13/14 359/356 |
| 2012/0176668 A1 | 7/2012 | Saito et al. | |
| 2013/0083200 A1* | 4/2013 | Saito | G02B 13/18 348/164 |

FOREIGN PATENT DOCUMENTS

| JP | 06-230275 A | 8/1994 |
| JP | 08-146290 A | 6/1996 |
| JP | 09-230233 A | 9/1997 |
| JP | 11-326757 A | 11/1999 |
| JP | 2002-014283 A | 1/2002 |
| JP | 2008-128913 A | 6/2008 |
| JP | 2011-158550 A | 8/2011 |
| JP | 2012-141522 A | 7/2012 |

OTHER PUBLICATIONS

International Search Report and written opinion dated Dec. 10, 2013 corresponding to International Patent Application No. PCT/JP2013/073663 and partial English translation thereof.

* cited by examiner

*Primary Examiner* — Darryl J Collins
*Assistant Examiner* — Journey Sumlar
(74) *Attorney, Agent, or Firm* — Haynes and Boone, LLP

(57) ABSTRACT

An infrared imaging system used for infrared rays of wavelength of 5 micrometers or greater, the system including, from the object side to the image side, an aperture, a lens made of synthetic resin and an imaging element, the object side surface of the lens being convex to the object side in the paraxial area, wherein F-number of the system is 1.4 or smaller.

10 Claims, 19 Drawing Sheets

SURFACE OF STEP HEIGHT PORTION

SURFACE OF STEP HEIGHT PORTION

SURFACE OF STEP HEIGHT PORTION

SURFACE OF STEP HEIGHT PORTION

INFRARED IMAGING SYSTEM

TECHNICAL FIELD

One or more embodiments of the invention relate generally to infrared imaging and more particularly, for example, to systems and methods for providing lenses for infrared imaging systems.

BACKGROUND ART

In thermography, nightscopes, security systems, and the like, imaging systems for electromagnetic waves of the wavelength range from several to several tens of micrometers are used. The electromagnetic waves of the above-described wavelength range are referred to as far-infrared rays. In imaging systems that image far-infrared rays, data of far-infrared rays are captured by an imaging element in which infrared detecting elements are arranged in array. Conventional infrared detecting elements include a thermopile type which utilizes electromotive force generated by a temperature change caused by collected infrared rays, a bolometer type which utilizes a change in electric resistance generated by a temperature change, a pyroelectric type which utilizes a change in an amount of charge generated by a temperature change, a photon detecting type which utilizes a energy level transition of an electron caused by absorption of a photon, and the like. When any type of infrared detecting element is used, incoming infrared rays must be collected and directed onto the imaging element by optics of the constituent imaging system.

Conventionally, glass and synthetic resin are used as materials of optical lenses. In particular, synthetic resin is advantageous in that optical lenses can be made from it at lower costs using injection molding or the like. In general, however, transmittance of a synthetic resin material for far-infrared rays is lower than transmittance of the synthetic resin material for visible light, and therefore a synthetic resin lens which used for visible light imaging systems typically cannot be used for far-infrared imaging systems. In other words, if a synthetic resin lens that is used for visible light imaging systems is coopted for use with far-infrared imaging systems, the amount of infrared radiation becomes insufficient because of absorption of far-infrared rays of the synthetic resin lens.

Accordingly, lenses of conventional far-infrared imaging systems typically employ relatively expensive materials that absorb less infrared radiation, such as germanium and various chalcogenides, or other materials that can only be shaped by machining and therefore require higher manufacturing costs, such as silicon (e.g., see JP2002-014283 and JP11-326757, where are hereby incorporated by reference in their entirety).

Thus, there is a need for a far-infrared imaging system including a synthetic resin lens that is capable of providing a sufficient amount of infrared radiation to an imaging element of the imaging system.

SUMMARY

Techniques are disclosed for systems and methods to provide synthetic resin lenses for infrared imaging systems. An infrared imaging system according to an embodiment of the present disclosure includes, from the object side to the image side, an aperture, a lens made of synthetic resin, the object side surface of the lens being convex to the object side in the paraxial area, and the system being used for infrared rays of wavelength of 5 micrometers or greater. The F-number of the system is 1.4 or smaller. The system is configured such that in a bundle of parallel rays, the bundle being incident onto the infrared imaging system with a positive incident angle $\theta$ with respect to an optical axis for the system, an angle measured counter-clockwise which an upper ray forms with the optical axis before passing through the entry surface is $\theta 0U$, an angle measured counter-clockwise which the upper ray forms with the optical axis after passing through the entry surface is $\theta 1U$, and $\Delta\theta 1U = \theta 1U - \theta 0U$, $\Delta\theta 1U$ is negative in the range of $\theta$ from 0 to the maximum value for the infrared imaging system and $\Delta\theta 1U$ monotonously decreases in the range in which $\theta$ is 60% or smaller of the maximum value. The system is further configured such that an angle measured counter-clockwise which a lower ray forms with the optical axis before passing through the entry surface is $\theta 0L$, an angle which the lower ray forms with the optical axis after passing through the entry surface is $\theta 1L$, and $\Delta\theta 1L = \theta 1L - \theta 0L$, $\Delta\theta 1L$ is positive at $\theta = 0$ and $\Delta\theta 1L$ becomes negative as $\theta$ increases.

In the infrared imaging system according to an embodiment of the present disclosure, for the upper ray, the entry surface and the exit surface have positive refractive power while $\theta$ changes from 0 to the maximum value for the infrared imaging system, and the refractive power increases with increase of $\theta$. As a result, the refractive power of the exit surface is relatively reduced, and therefore, the lens thickness can be reduced by reducing the SAG of the surface. Absorption of infrared rays can be reduced by reducing the lens thickness.

In the infrared imaging system according to an embodiment of the present disclosure, for the lower ray, the entry surface and the exit surface have positive refractive power when $\theta$ is in a lower range, and therefore, the focal length of the lens becomes shorter and the F-number becomes smaller. With increase of $\theta$, the refractive power of the entry surface becomes negative, and the absolute value of the negative refractive power increases. As a result, the converging angle becomes greater for a greater value of $\theta$.

In the infrared imaging system according to an embodiment of the present disclosure, the F-number on the optical axis is 1.4 or smaller. Further, absorption of infrared rays is reduced by reducing the thickness of the lens made of synthetic resin. Accordingly, the infrared imaging system according to an embodiment of the present disclosure is capable of obtaining a sufficient amount of light using a lens made of synthetic resin.

In an infrared imaging system according to an embodiment of the present disclosure, the lens made of synthetic resin is made of high-density polyethylene.

According to an embodiment of the present disclosure, a lens which absorbs a relatively small amount of infrared rays can be manufactured at a lower cost by the use of high-density polyethylene for the lens material.

In an infrared imaging system according to another embodiment, a ratio $t0/f$ of a distance $t0$ between the aperture and the entry surface of the lens made of synthetic resin to a focal length $f$ is 0.2 or greater.

In such embodiment, locations of incident rays are largely distributed on the entry surface for a predetermined angle of view, and therefore rays with a wide angle of view can be more easily controlled by the shape of the entry surface.

In an infrared imaging system according to another embodiment of the present disclosure, the image side surface of the lens made of synthetic resin includes a Fresnel lens surface.

In such embodiment, by shaping the exit surface as a Fresnel lens surface, the lens thickness can be further reduced by reducing the sag of the exit surface, and therefore absorption of infrared rays of the lens made of synthetic resin can be further reduced.

In an infrared imaging system according to another embodiment, the system is configured such that a converging angle in full angle at the imaging surface is 50° or greater for 80% or more of the range of θ from 0 to the maximum value for the infrared imaging system.

Accordingly, the infrared imaging system is capable of obtaining a sufficient amount of light for a wide range of θ. The phrase "80% or more of the range of θ from 0 to the maximum value" is intended to exclude exceptional areas such as that around the maximum value for the infrared imaging system.

In an infrared imaging system according to another embodiment, the maximum angle of view in full angle is 60° or greater.

According to such embodiment, an infrared imaging system with a wide angle of view is capable of obtaining a sufficient amount of light even though it employs a lens made of synthetic resin.

An infrared imaging system according to another embodiment further includes another lens made of inorganic material.

According to such embodiment, an infrared imaging system which is capable of obtaining a larger amount of light is provided by combining a lens made of inorganic material, which absorbs a smaller amount of infrared rays, and a lens made of synthetic resin, which is easy to shape and lower in cost.

An infrared imaging system according to another embodiment includes only a lens or lenses made of synthetic resin.

According to such embodiment, a lower-cost infrared imaging system can be realized.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

Embodiments of the invention and their advantages are best understood by referring to the detailed description that follows. It should be appreciated that like reference numerals are used to identify like elements illustrated in one or more of the figures.

DESCRIPTION OF EMBODIMENTS

Figure 1:
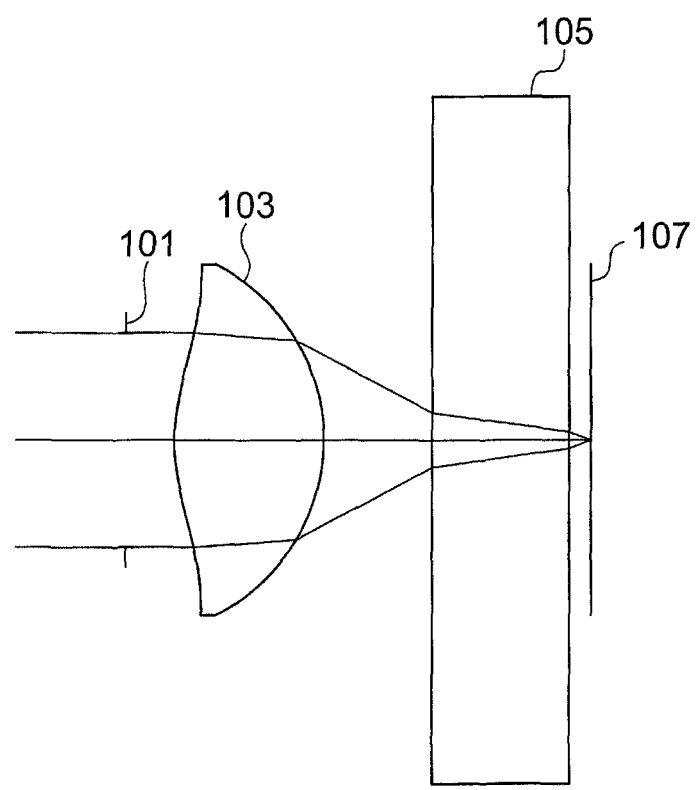
FIG. 1 shows a construction of an infrared imaging system in accordance with an embodiment of the disclosure.

FIG. 1 shows a construction of an infrared imaging system in accordance with an embodiment of the disclosure. In the infrared imaging system, from the object side to the image side an aperture 101, a lens 103, a protective plate 105 and an image surface 107 are disposed. The entry surface of the lens 103 (the object side surface) is shaped such that the surface is convex to the object side. The horizontal straight line which passes through the center of the aperture 101 and the center of the lens 103 is designated as the optical axis.

Figure 2:
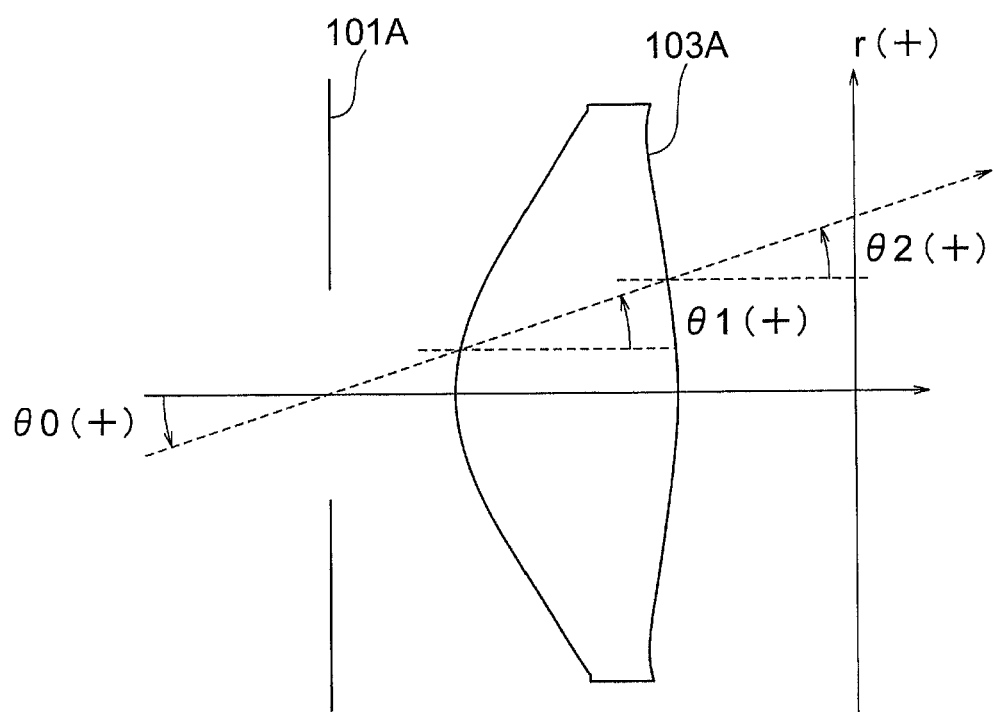
FIG. 2 illustrates rays entering a lens in accordance with an embodiment of the disclosure.

FIG. 2 illustrates rays which enters a lens 103A. In a plane which contains the optical axis, r axis which is orthogonal to the optical axis is designated. The positive direction of the optical axis is designated as one from the object to the image. In the above-described plane, an angle measured counter-clockwise between a ray that enters the lens 103A and the optical axis, before entering the lens, is represented by θ0. In the present embodiment, θ0 is identical with an angle θ measured counter-clockwise between a ray that enters the optical system and the optical axis before entering the optical system (e.g., at aperture 101A). The angle θ may also be referred to as angle of view represented in half angle. Further, an angle measured counter-clockwise between the above-described ray and the optical axis at the entry surface after having entered the lens 103A is represented as θ1, and an angle measured counter-clockwise between the above-described ray and the optical axis at the exit surface after having exited the lens 103A is represented as θ2.

Figure 3:
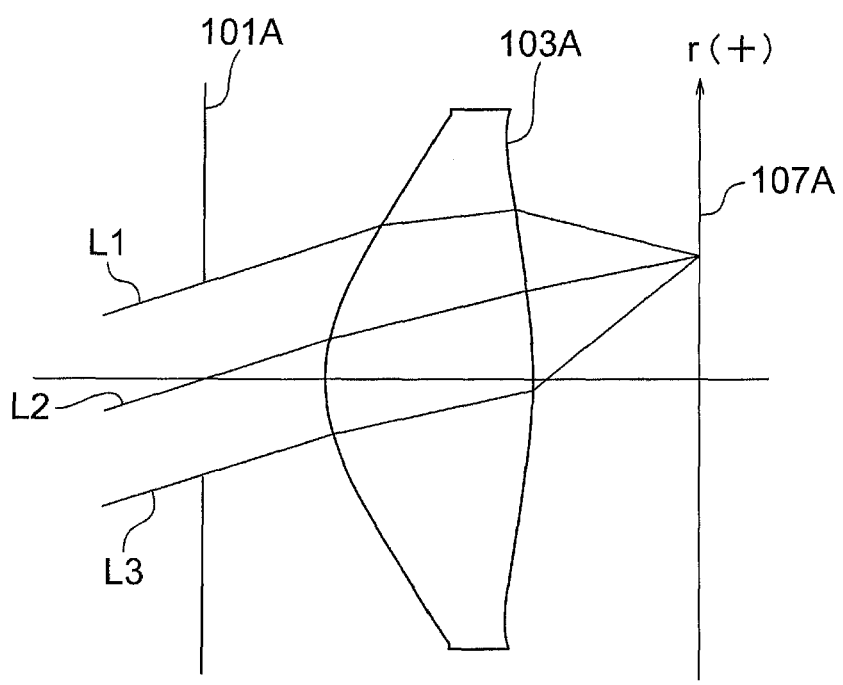
FIG. 3 illustrates a bundle of parallel rays entering the lens in accordance with an embodiment of the disclosure.

FIG. 3 illustrates a bundle of parallel rays that enter the lens 103A. FIG. 3 shows a cross section that contains the optical axis. In FIG. 3, an angle measured counter-clockwise between rays that enter the lens 103A and the optical axis before entering the lens is designated as positive (e.g., a corresponding angle measured clockwise would be designated as negative). In the above-described bundle of parallel rays, the ray L1 that enters the highest location from the optical axis on the entry surface of the lens 103A is referred to as the upper ray. Further, in the above-described bundle of parallel rays, the ray L3 which enters the lowest location on the entry surface of the lens 103A is referred to as the lower ray. In the above-described bundle of parallel rays, the ray L2 that passes through the center of the aperture 101 is the principal ray.

Figure 4A:
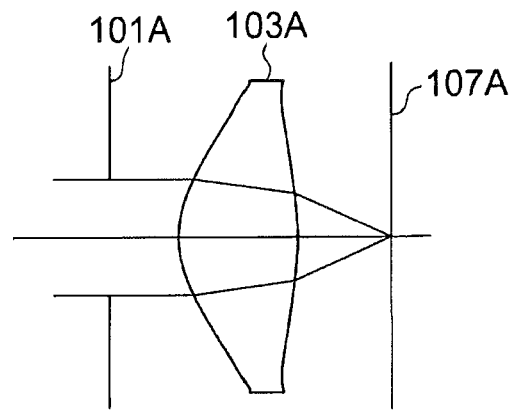
FIGS. 4A to 4C illustrate how the lens works for bundles of parallel rays with various angles of view, in accordance with an embodiment of the disclosure.
Figure 4B:
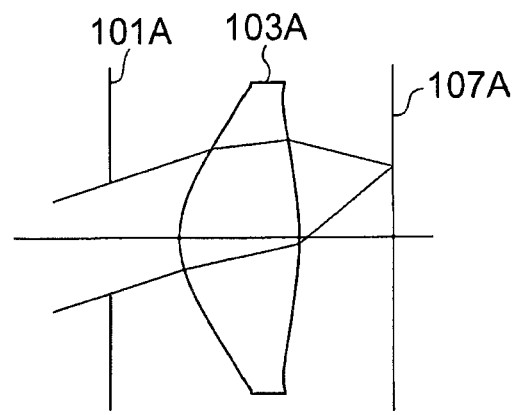
Figure 4C:
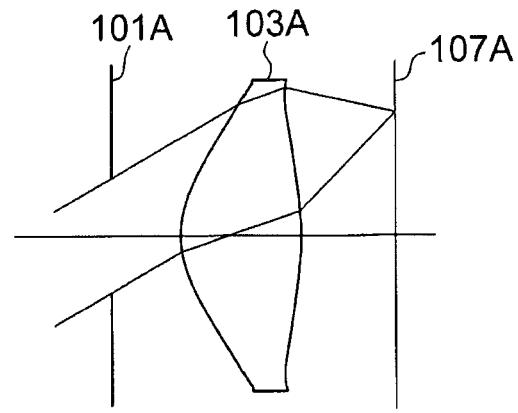

FIGS. 4A to 4C illustrate how the lens 103A works for bundles of parallel rays with various angles of view. FIG. 4A shows the case in which the angle of view is 0 degrees. FIG. 4B shows the case in which the angle of view is of a relatively small positive value. FIG. 4C shows the case in which the angle of view is of a relatively great positive value. According to FIGS. 4A to 4C, since the aperture and the entry surface is at a distance from each other, rays from different angles of view enter the lens in a distributed manner on the entry surface of the lens, resulting in easier control of the large field angle rays.

Figure 5:
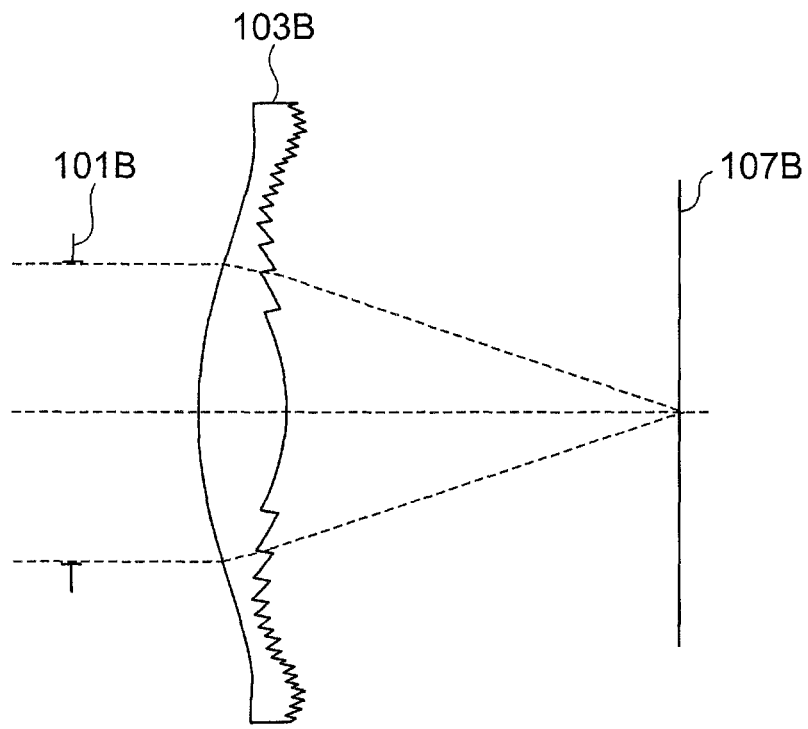
FIG. 5 shows a construction of an infrared imaging system in accordance with an embodiment of the disclosure.

FIG. 5 shows a construction of an infrared imaging system according to another embodiment of the present disclosure. In the infrared imaging system, from the object side to the image side an aperture 101B, a lens 103B and an image surface 107B are disposed. The entry surface of the lens 103B (the object side surface) is shaped such that the surface is convex to the object side. Further, the exit surface of the lens 103B is a Fresnel lens surface. By forming the exit surface as a Fresnel lens surface, the sag of the exit surface can be restricted and the lens thickness can be further reduced. Further, when the refractive index of a material of the lens is represented as n, and an angle which an incident ray to the Fresnel lens surface forms with the normal to the Fresnel lens surface is represented as θF, |n*sin(θF)| should preferably be 1 or smaller for any rays in order to prevent total reflection on the Fresnel lens surface. In general, stray lights generated at step height portions of the Fresnel lens surface can reduce an amount of light reaching the image surface. However, this reduction of the amount of light can be counteracted by adjusting the angles of the step height portions so that they substantially align with angles of incident rays onto the Fresnel lens surface or angles of emergent rays from the Fresnel lens surface.

FIGS. 6A to 6D show behavior of rays around step height portions of a Fresnel lens surface. A represents incident rays while B represents emergent rays.

In general, step height portions of a Fresnel lens are formed to be parallel to the optical axis, or have a draft angle for ease of manufacture. Some inclinations of the step height portions may generate stray lights, which can reduce an amount of light reaching the image surface. This effect can be counteracted by adjusting angles of the step height portions so that they substantially align with angles of incident rays onto the Fresnel lens surface or angles of emergent rays from the Fresnel surface.

Figure 6A:
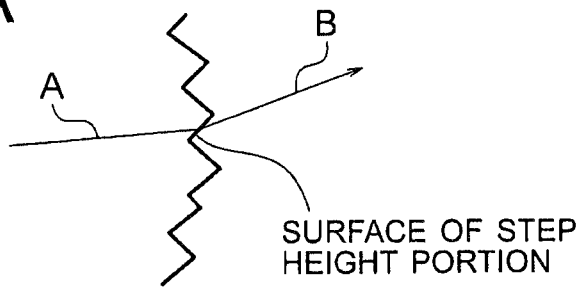
FIGS. 6A to 6D show behavior of rays around step height portions of a Fresnel lens surface in accordance with an embodiment of the disclosure.
Figure 6B:
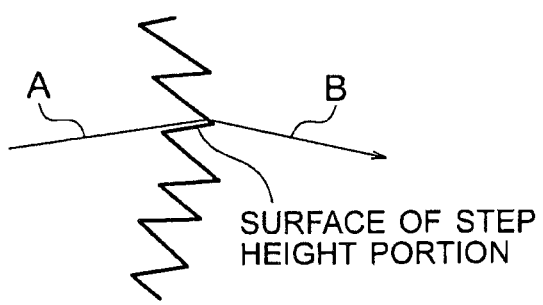
Figure 6C:
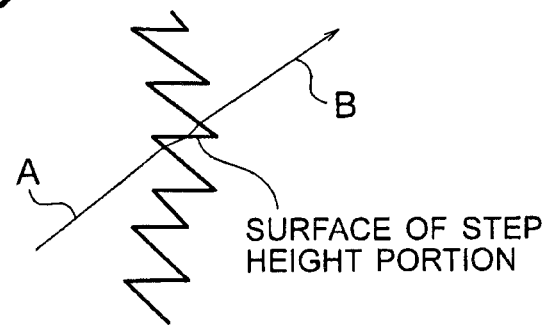
Figure 6D:
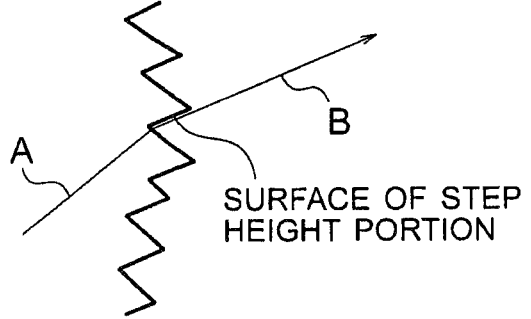

If inclinations of step height portions are large, as shown in FIG. 6A, for example, rays with smaller angles of view refract at surfaces of the step height portions. In FIG. 6B, the inclinations are adjusted to substantially align with incident angles of the rays, as shown. If inclinations of the step height portions are small, emergent rays impinge on surfaces of the step height portions and may refract again as shown in FIG. 6C. In FIG. 6D, the inclinations are adjusted to substantially align with emergent angles of the rays, as shown.

Such adjustment as is appropriate to rays with all angles of view is generally not possible, but the shapes of the step height portions may be determined such that priorities are assigned to rays with angles of view for which a greater amount of light is required. Moreover, the shapes of the step height portions near a paraxial portion of the Fresnel surface may be different than the shapes of the step height portions near an edge portion of the Fresnel surface.

Rays that pass through step height portions of the Fresnel lens surface behave differently from rays that pass through other portions of the lens (e.g., other than the step height portions). The following descriptions consider the rays which do not pass through the step height portions.

Examples and comparative examples of the infrared imaging systems according to the present disclosure will be described hereinafter. In various embodiments, the material of lenses of the examples and comparative examples (the lens on the image side when two lenses are disposed) may be high-density polyethylene (HDPE), with a refractive index of approximately 1.51 (e.g., at wavelength of 8 μm).

Shapes of lenses can be expressed by the aspherical lens equation.

$$Z = \frac{cr^2}{1 + \sqrt{1-(1+k)c^2r^2}} + \sum_{i=1}^{N} A_i r^i \qquad (1)$$

$$c = 1/R$$

where: Z is the sag (e.g., the lateral displacement of the surface of the lens from the center plane of the lens, for a particular r, r represents distance from the optical axis within the center plane of the lens, c represents curvature, R represents the radius of curvature C, k represents the conic constant, and Ai represents a series of aspheric coefficients. As used herein, the center plane of a lens is the plane perpendicular to the optical axis of the lens that passes through the center of the lens.

The material of the protective plate in front of the image surface may be silicon. The refractive index of the material is approximately 3.42 (e.g., at wavelength of 8 μm). The protective plate protects an imaging element (e.g., at an image surface) from contamination, breakage and the like.

In general, the lengths in the tables of the examples and comparative examples are provided in millimeters.

Example 1

Figure 7:
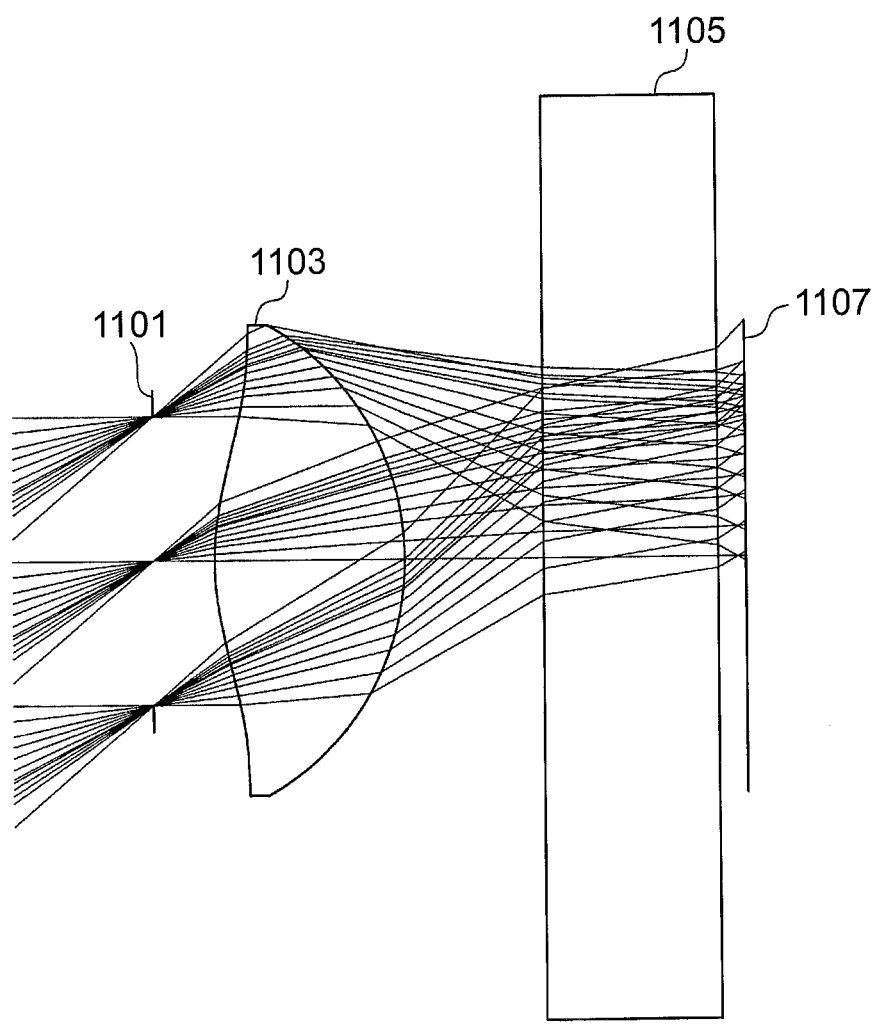
FIG. 7 shows a construction of an infrared imaging system according to Example 1 in accordance with an embodiment of the disclosure.

FIG. 7 shows a construction of an infrared imaging system according to Example 1. The infrared imaging system includes, from the object side to the image side, an aperture 1101, a lens 1103, a protective plate 1105 and an image surface 1107. The entry surface of the lens 1103 (the object side surface) is shaped such that the surface is convex to the object side at least in the paraxial area. The straight line which passes through the center of the aperture 1101 and the center of the lens 1103 and is perpendicular to the plane of the aperture 1101 is designated as the optical axis.

Along the optical axis, the distance between the aperture 1101 and the entry surface of the lens 1103 is represented as t0, the thickness of the lens 1103 at the center is represented as t1, and the distance between the lens 1103 and the image surface 1107 is represented as t2. The thickness of the lens 1103 in the optical axis direction at the periphery of the effective aperture is represented as Et. Further, the diameter of the entrance pupil is represented as EPD while the focal length of the optical system is represented as f. Both sides of the protective plate 1105 may be planar (e.g., to minimize machining), and the thickness of the plate may be 0.625 mm.

Table 1 shows measurements of the infrared imaging system according to Example 1.

TABLE 1

| | |
|---|---|
| t0 | 0.220 |
| t1 | 0.683 |
| t2 | 1.219 |
| Et | 0.068 |
| EPD | 1.000 |
| f | 1.001 |

The F-number is represented as F, and the following equation holds:

$F = f/EPD$

In the present example, the ratio t1/EPD of the thickness t1 of the lens at the center to the diameter of the entrance pupil EPD is 0.683.

The greater the diameter of the entrance pupil, the greater the amount of light that is received by the imaging system, and the thinner the thickness of the lens at the center t1, the smaller the absorption is, and therefore, the brighter the resulting image. Accordingly, the smaller t1/EPD, the brighter the resulting image.

In the present example, the ratio t0/f of the distance t0 between the aperture 1101 and the entry surface of the lens 1103 to the focal length f is 0.220.

FIGS. 4A to 4C show that for each field angle, the greater the distance between the aperture and the entry surface of the lens, the larger the lateral location of incident rays on the entrance surface of the lens. When the distribution of locations of incident rays on the entry surface are made wider, rays with wide angles of view can be more easily controlled using the shape of the entry surface (e.g., it is easier and less expensive to shape a lens surface with sufficient spatial accuracy over a larger surface area). Accordingly, the greater t0/f, which represents the distance between the aperture and the entry surface of the lens normalized by the focal length, the more convenient it is for controlling rays using the shape of the entry surface of the lens.

Table 2 shows values of the coefficients of Equation (1) representing the entry surface and the exit surface of the lens 1103. The entry surface of the lens 1103 is aspherical while the exit surface is spherical.

TABLE 2

| | Entry surface | Exit surface |
|---|---|---|
| R | 0.858 | −0.922 |
| c | 1.166 | −1.084 |
| k | −10.000 | 0.000 |
| A2 | 0.000 | 0.000 |
| A4 | −0.132 | 0.000 |
| A6 | 0.367 | 0.000 |
| A8 | −1.629 | 0.000 |
| A10 | 1.557 | 0.000 |

The maximum angle of view in full angle of the infrared imaging system according to Example 1 is 80°. The function of the lens 1103 will be described below.

Figure 8:
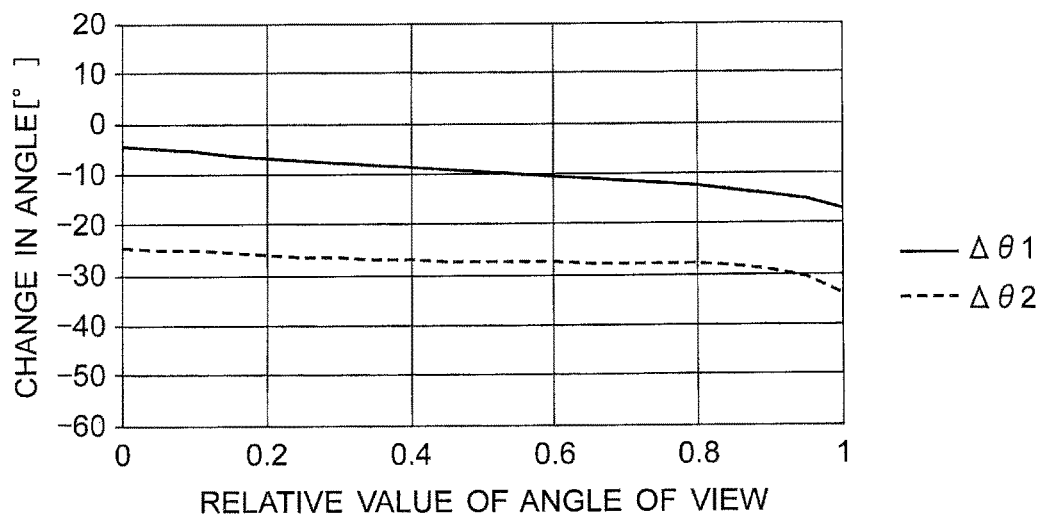
FIG. 8 shows relationships between relative value of angle of view and changes in angle of the upper ray at the entry surface and at the exit surface in the infrared imaging system according to Example 1 in accordance with an embodiment of the disclosure.

FIG. 8 shows relationships between the relative value of angle of view and changes in angle of the upper ray at the entry surface and at the exit surface in the infrared imaging system according to Example 1. The horizontal axis in FIG. 8 represents the relative value of angle of view. The relative value of angle of view is the value obtained by dividing an angle of view by the maximum angle of view, and is an absolute number. The vertical axis in FIG. 8 represents changes in angle Δθ1 and Δθ2. Δθ1 and Δθ2 represent values of changes in angle of a ray which enters the lens 1103 from a designated relative value of angle of view, respectively at the entry surface and at the exit surface, and can be expressed by the following equations. In the following equations, θ0, θ1 and θ2 are those which have been defined using FIG. 2.

$\Delta\theta1=\theta1-\theta0$ $\Delta\theta2=\theta2-\theta1$

For the upper ray, a positive value of change in angle corresponds to a negative refractive power (which diffuses rays), while a negative value of change in angle corresponds to a positive refractive power (which makes rays converge). For angles of view from 0 to the maximum angle of view, the entrance surface and the exit surface have positive refractive power, and the positive refractive power increases with increase in angle of view particularly at the entrance surface. As a result, the refractive power of the exit surface can be reduced to a relatively small value, and therefore the lens thickness can be reduced by reducing the sag of the surface. By the reduction of the lens thickness, absorption of infrared rays can be reduced.

Figure 9:
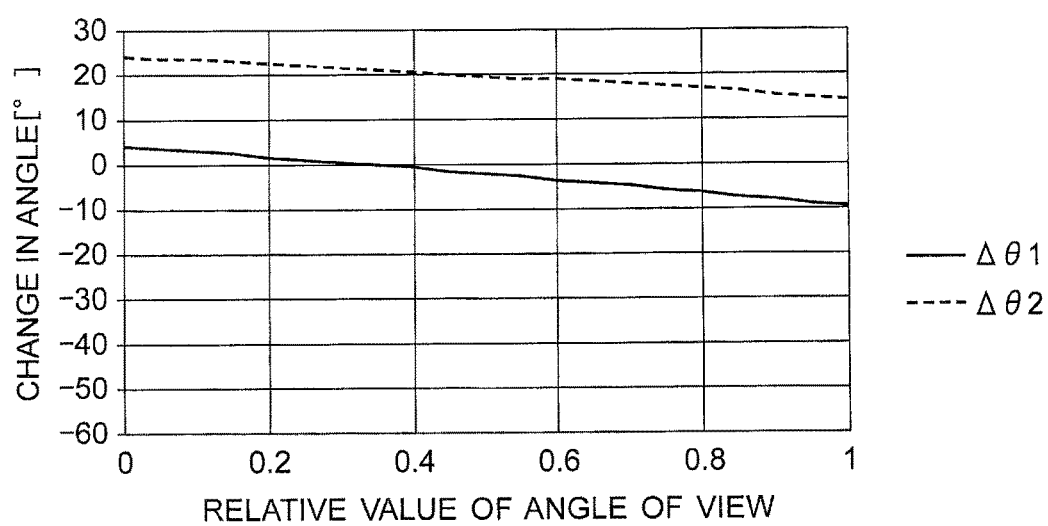
FIG. 9 shows relationships between relative value of angle of view and changes in angle of the lower ray at the entry surface and at the exit surface in the infrared imaging system according to Example 1 in accordance with an embodiment of the disclosure.

FIG. 9 shows relationships between relative value of angle of view and changes in angle of the lower ray at the entry surface and at the exit surface in the infrared imaging system according to Example 1. The horizontal axis in FIG. 9 represents relative value of angle of view. The vertical axis in FIG. 9 represents changes in angle $\Delta\theta 1$ and $\Delta\theta 2$.

For the lower ray, a negative value of change in angle corresponds to a negative refractive power (which diffuses rays), while a positive value of change in angle corresponds to a positive refractive power (which makes rays converge). When the angle of view is lower, the entrance surface and the exit surface have positive refractive power, and therefore the focal length of the lens becomes smaller and the F-number becomes smaller. With increase of the angle of view, the refractive power of the entry surface becomes negative and the absolute value of the negative refractive power increases. As a result, rays are significantly refracted at the exit surface to converge, and therefore the converging angle at the image surface for greater angles of view becomes greater.

Figure 10:
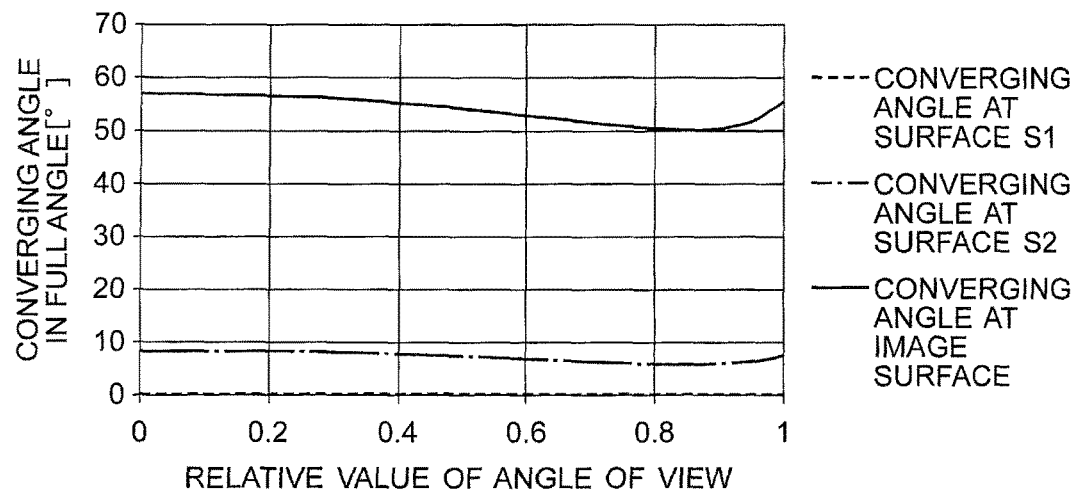
FIG. 10 shows relationships between relative value of angle of view and converging angles in full angle in the infrared imaging system according to Example 1 in accordance with an embodiment of the disclosure.

FIG. 10 shows relationships between relative value of angle of view and converging angles in full angle in the infrared imaging system according to Example 1. The horizontal axis in FIG. 10 represents relative value of angle of view while the vertical axis represents converging angles in full angle at the entry surface (surface S1), the exit surface (surface S2) and the image surface. The converging angle in full angle at the entry surface, that at the exit surface and that at the image surface will be described hereinafter. When an angle measured counter-clockwise which the upper ray forms with the optical axis before passing through the entry surface is represented as $\theta 0U$, an angle measured counter-clockwise which the upper ray forms with the optical axis after passing through the entry surface is represented as $\theta 1U$, an angle measured counter-clockwise which the upper ray forms with the optical axis after passing through the exit surface is represented as $\theta 2U$, an angle measured counter-clockwise which the lower ray forms with the optical axis before passing through the entry surface is represented as $\theta 0L$, an angle measured counter-clockwise which the lower ray forms with the optical axis after passing through the entry surface is represented as $\theta 1L$ and an angle measured counter-clockwise which the lower ray forms with the optical axis after passing through the exit surface is represented as $\theta 2L$, the converging angle in full angle at the entry surface, that at the exit surface and that at the image surface are respectively expressed as below.

$\theta 0L - \theta 0U$ $\theta 1L - \theta 1U$ $\theta 2L - \theta 2U$

According to FIG. 10, the converging angle in full angle at the image surface is 50° or greater for all angles of view. Further, the converging angle in full angle for the angle of view of 0 degree, that is, the converging angle on the optical axis is 57.2°, and the F number is 1.001.

Figure 11:
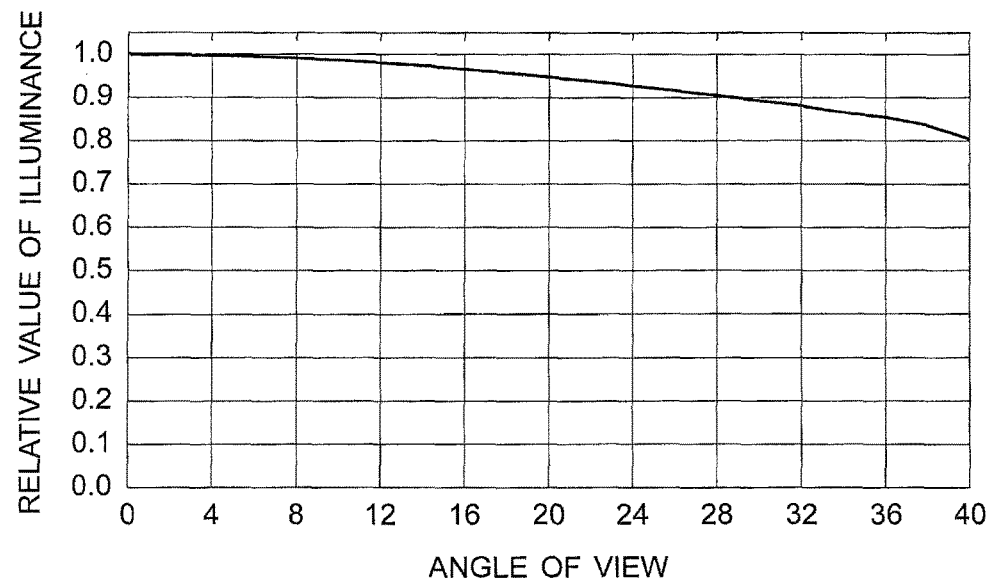
FIG. 11 shows a relationship between angle of view and relative value of illuminance in the infrared imaging system according to Example 1 in accordance with an embodiment of the disclosure.

FIG. 11 shows a relationship between angle of view and relative value of illuminance in the infrared imaging system according to Example 1. The horizontal axis in FIG. 11 represents angle of view while the vertical axis represents relative value of illuminance. The unit of angle of view is degree. The relative value of illuminance is the value which is obtained by dividing the value of illuminance by the maximum value of illuminance, and is an absolute value. Illuminance shows the maximum value when the angle of view is 0. According to FIG. 11, the relative values of illuminance is 0.8 or greater for all angles of view.

Example 2

Figure 12:
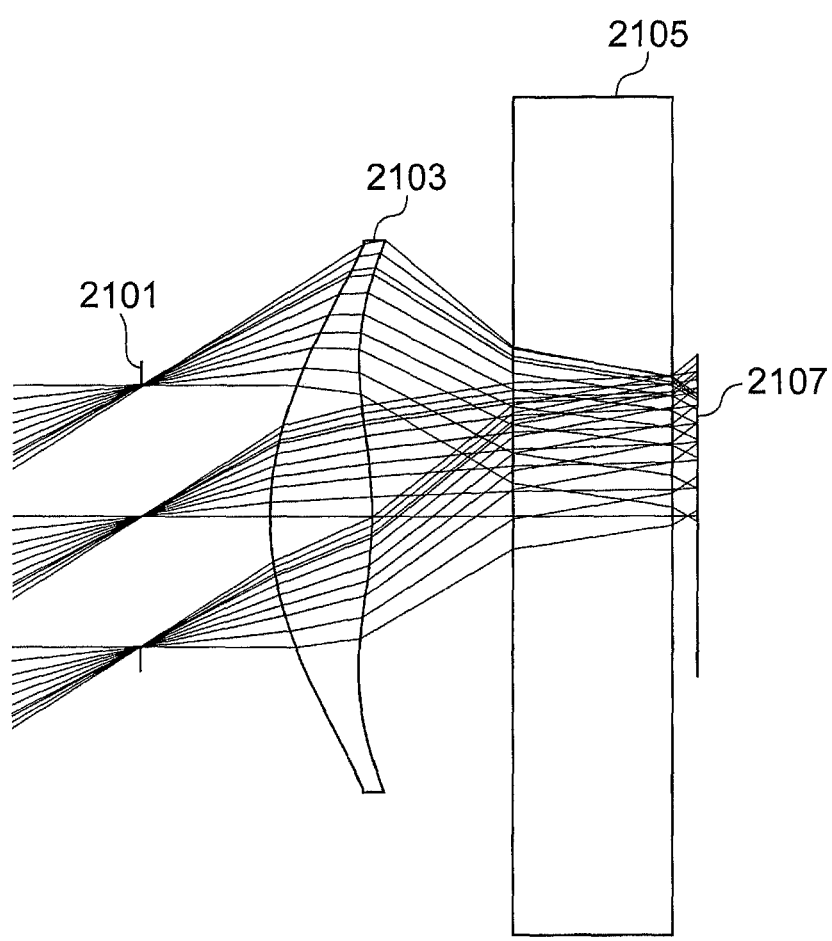
FIG. 12 shows a construction of an infrared imaging system according to Example 2 in accordance with an embodiment of the disclosure.

FIG. 12 shows a construction of an infrared imaging system according to Example 2. In the infrared imaging system, from the object side to the image side an aperture 2101, a lens 2103, a protective plate 2105 and an image surface 2107 are disposed. The entry surface of the lens 2103 (the object side surface) is shaped such that the surface is convex to the object side in the paraxial area. Although not shown in FIG. 12, the exit surface of the lens 2103 is shaped as a Fresnel lens. The straight line which passes through the center of the aperture 2101 and the center of the lens 2103 and is perpendicular to the plane of the aperture 2101 is designated as the optical axis.

Along the optical axis, the distance between the aperture 2101 and the entry surface of the lens 2103 is represented as t0, the thickness of the lens 2103 at the center is represented as t1, and the distance between the lens 2103 and the image surface 2107 is represented as t2. The thickness of the lens 2103 in the optical axis direction at the periphery of the effective aperture is represented as Et. Further, the diameter of the entrance pupil is represented as EPD while the focal length of the optical system is represented as f. The both sides of the protective plate 2105 are planar, and the thickness of the plate is 0.625 mm.

Table 3 shows measurements of the infrared imaging system according to Example 2.

TABLE 3

| | |
|---|---|
| t0 | 0.511 |
| t1 | 0.400 |
| t2 | 1.281 |
| Et | 0.081 |
| EPD | 1.000 |
| F | 1.039 |

In the present example, the ratio t1/EPD of the thickness t1 of the lens at the center to the diameter of the entrance pupil EPD is 0.400.

In the present example, the ratio t0/f of the distance t0 between the aperture 2101 and the entry surface of the lens 2103 to the focal length f is 0.492.

Table 4 shows values of the coefficients of Equation (1) representing the entry surface and the exit surface of the lens 2103. The entry surface of the lens 2103 is aspherical while the base lens shape and the Fresnel lens shape of the exit surface are also aspherical.

TABLE 4

| | Entry surface | Exit surface (base) | Exit surface (Fresnel) |
|---|---|---|---|
| R | 1.192 | −1.447 | −2.036 |
| c | 0.839 | −0.691 | −0.491 |
| k | −1.000 | −0.505 | −2.568 |

TABLE 4-continued

|  | Entry surface | Exit surface (base) | Exit surface (Fresnel) |
|---|---|---|---|
| A2 | 0.000 | 0.000 | 0.000 |
| A4 | −0.033 | 0.766 | −0.438 |
| A6 | −0.039 | −0.605 | 0.106 |
| A8 | 0.000 | 0.319 | 0.005 |
| A10 | 0.000 | −0.084 | 0.000 |

The shape of the exit surface is determined by the sum of the sag of the base lens and the sag of the Fresnel lens.

Figure 27:
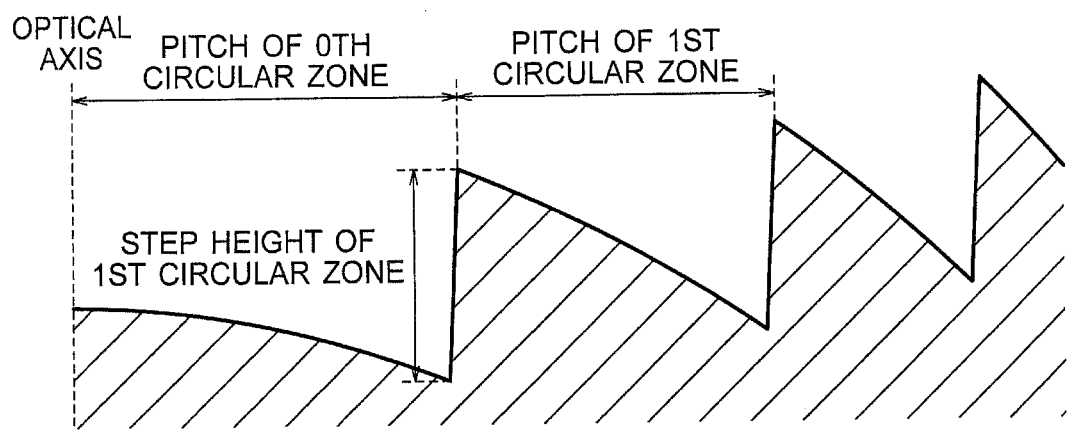
FIG. 27 illustrates step height and pitch of the exit surface provided with a Fresnel lens surface in accordance with an embodiment of the disclosure.

FIG. 27 illustrates step height and pitch of the exit surface provided with a Fresnel lens surface. In the present example, values of pitch are determined such that values of step height are made invariant. Alternatively, values of step height can be made variant depending on values of pitch. In the drawing, the lens is diagonally shaded.

Table 5 shows values of step height and pitch of the exit surface provided with a Fresnel lens surface. Further, the value of pitch of the outermost circular zone is a distance from the outermost step height location up to the periphery of the effective aperture of the lens.

TABLE 5

| Circular zone | Pitch [mm] | Step height [mm] |
|---|---|---|
| 0 | 0.402 | — |
| 1 | 0.399 | 0.25 |
| 2 | 0.230 | 0.25 |
| 3 | 0.179 | 0.25 |

The maximum angle of view in full angle of the infrared imaging system according to Example 2 is 64°. The function of the lens 2103 will be described below.

Figure 13:
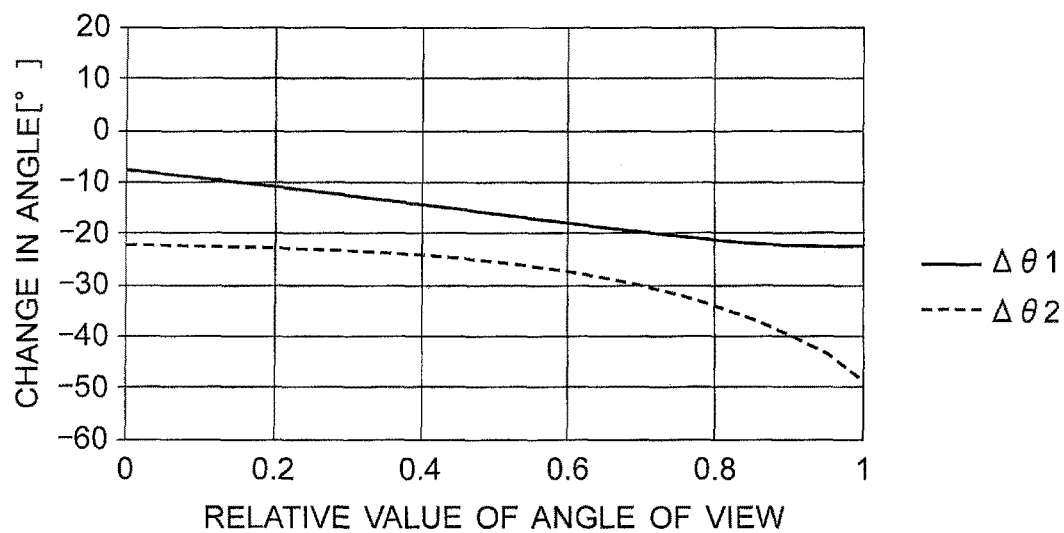
FIG. 13 shows relationships between relative value of angle of view and changes in angle of the upper ray at the entry surface and at the exit surface in the infrared imaging system according to Example 2 in accordance with an embodiment of the disclosure.

FIG. 13 shows relationships between relative value of angle of view and changes in angle of the upper ray at the entry surface and at the exit surface in the infrared imaging system according to Example 2. The horizontal axis in FIG. 13 represents relative value of angle of view. The relative value of angle of view is the value obtained by dividing an angle of view by the maximum angle of view, and is an absolute number. The vertical axis in FIG. 13 represents changes in angle $\Delta\theta 1$ and $\Delta\theta 2$. $\Delta\theta 1$ and $\Delta\theta 2$ represent values of changes in angle of a ray which enters the lens 2103 with a predetermined angle of view, respectively at the entry surface and at the exit surface, and can be expressed by the following equations.

$$\Delta\theta 1 = \theta 1 - \theta 0$$

$$\Delta\theta 2 = \theta 2 - \theta 1$$

For the upper ray, a positive value of change in angle corresponds to a negative refractive power (which diffuses rays), while a negative value of change in angle corresponds to a positive refractive power (which makes rays converge). For angles of view from 0 to the maximum angle of view, the entrance surface and the exit surface have positive refractive power. At the entrance surface, the positive refractive power increases with increase in angle of view when the relative angle of view is smaller than 0.9. As a result, the refractive power of the exit surface can be reduced to a relatively small value, and therefore the lens thickness can be reduced by reducing the sag of the exit surface. Further, around the relative angle of view of 1.0, the refractive power of the entry surface becomes weaker, and the refractive power of the exit surface increases. As a result, the converging angle at the image surface 2107 increases.

Figure 14:
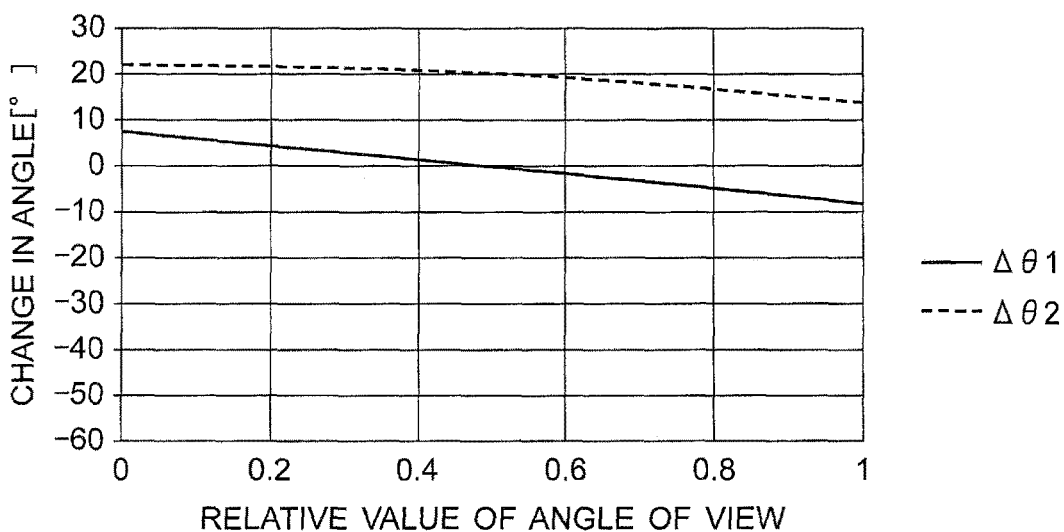
FIG. 14 shows relationships between relative value of angle of view and changes in angle of the lower ray at the entry surface and at the exit surface in the infrared imaging system according to Example 2 in accordance with an embodiment of the disclosure.

FIG. 14 shows relationships between relative value of angle of view and changes in angle of the lower ray at the entry surface and at the exit surface in the infrared imaging system according to Example 2. The horizontal axis in FIG. 14 represents relative value of angle of view. The vertical axis in FIG. 14 represents changes in angle $\Delta\theta 1$ and $\Delta\theta 2$.

For the lower ray, a negative value of change in angle corresponds to a negative refractive power (which diffuses rays), while a positive value of change in angle corresponds to a positive refractive power (which makes rays converge). When the angle of view is lower, the entrance surface and the exit surface have positive refractive power, and therefore the focal length of the lens becomes smaller and the F-number becomes smaller. With increase of the angle of view, the refractive power of the entry surface becomes negative and the absolute value of the negative refractive power increases. As a result, rays are significantly refracted at the exit surface to converge, and therefore the converging angle at the image surface for greater angles of view becomes greater.

Figure 15:
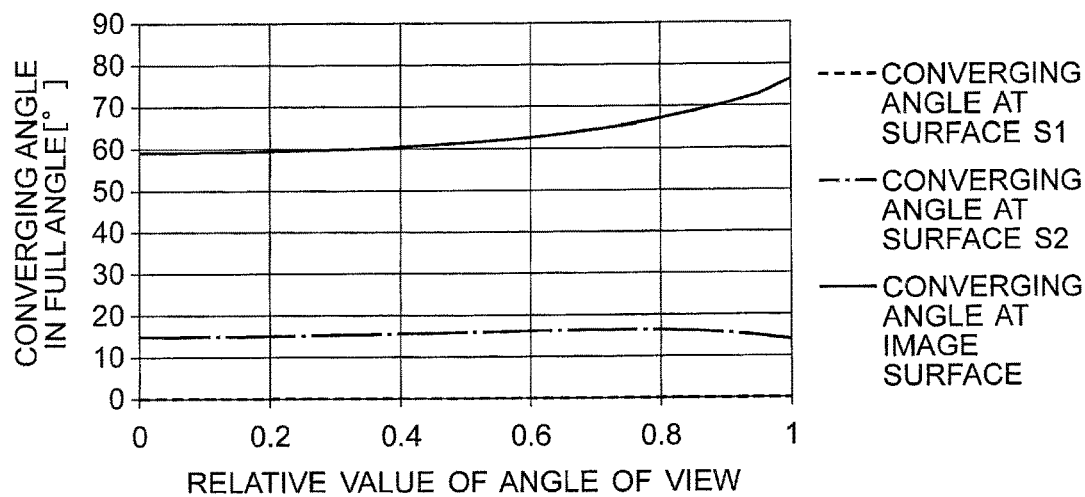
FIG. 15 shows relationships between relative value of angle of view and converging angles in full angle in the infrared imaging system according to Example 2 in accordance with an embodiment of the disclosure.

FIG. 15 shows relationships between relative value of angle of view and converging angles in full angle in the infrared imaging system according to Example 2. The horizontal axis in FIG. 15 represents relative value of angle of view while the vertical axis represents converging angles in full angle at the entry surface (surface S1), the exit surface (surface S2) and the image surface. According to FIG. 15, the converging angle in full angle at the image surface is 59° or greater for all angles of view. Further, the converging angle in full angle for the angle of view of 0 degree, that is, the converging angle on the optical axis is 59°, and the F number is 1.039.

Figure 16:
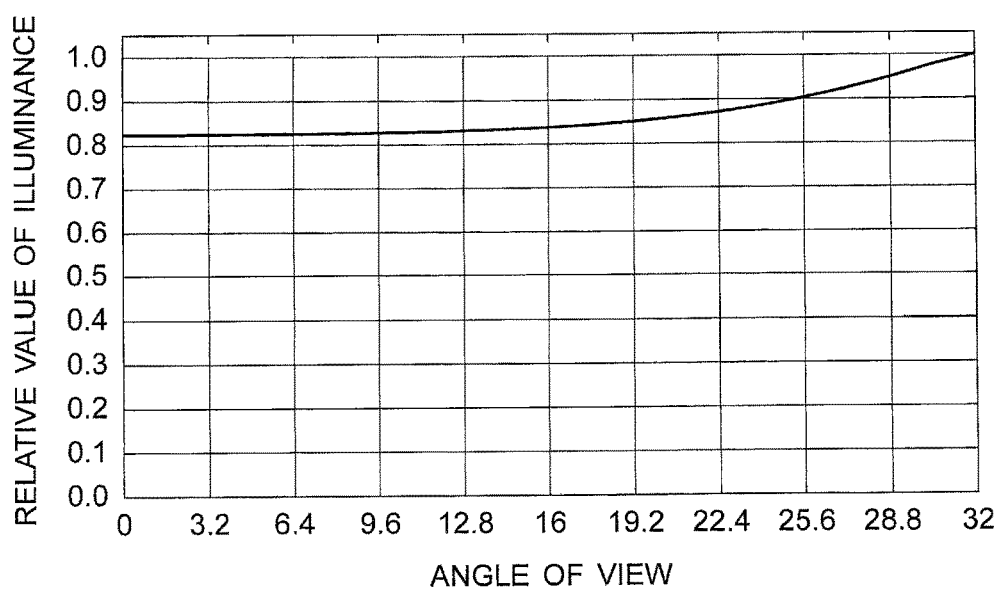
FIG. 16 shows a relationship between angle of view and relative value of illuminance in the infrared imaging system according to Example 2 in accordance with an embodiment of the disclosure.

FIG. 16 shows a relationship between angle of view and relative value of illuminance in the infrared imaging system according to Example 2. The horizontal axis in FIG. 16 represents angle of view while the vertical axis represents relative value of illuminance. The relative value of illuminance is the value which is obtained by dividing a value of illuminance by the maximum value of illuminance, and is an absolute value. Illuminance shows the maximum value when the angle of view is 32° (the maximum value). According to FIG. 16, the relative values of illuminance is 0.8 or greater for all angles of view.

Example 3

Figure 17:
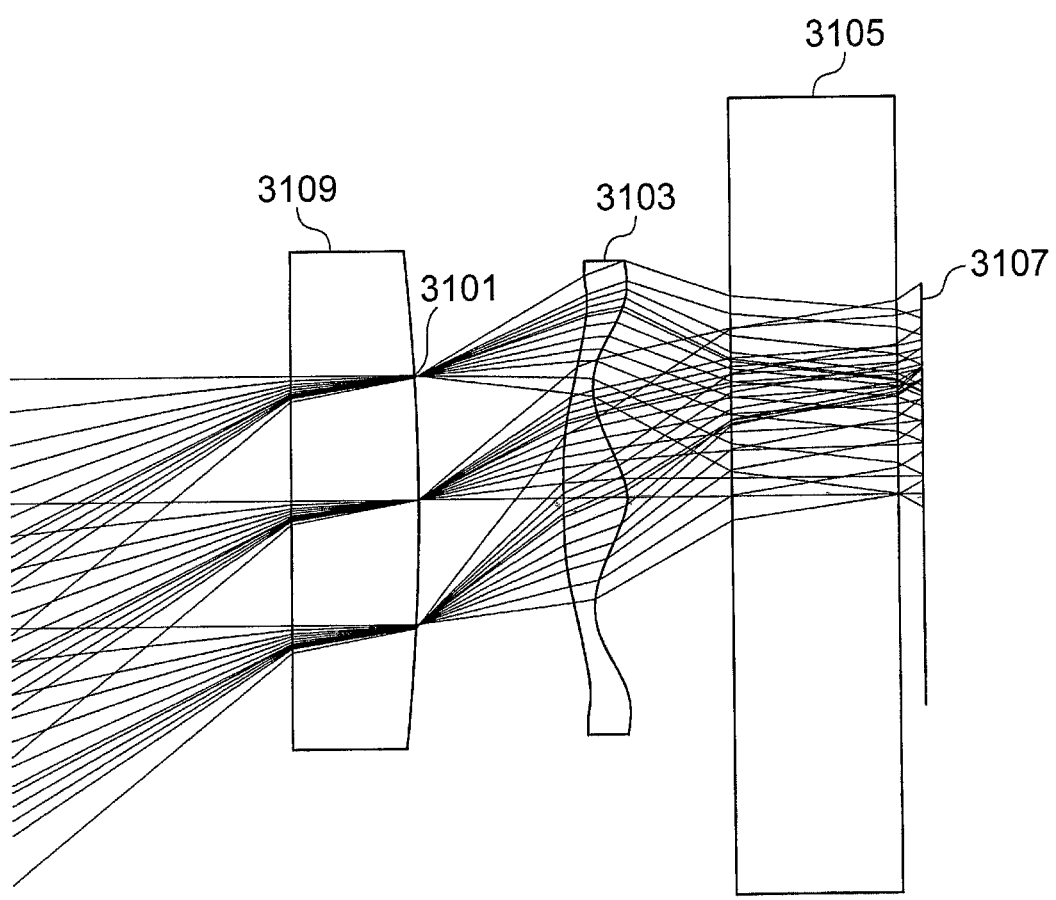
FIG. 17 shows a construction of an infrared imaging system according to Example 3 in accordance with an embodiment of the disclosure.

FIG. 17 shows a construction of an infrared imaging system according to Example 3. In the infrared imaging system, from the object side to the image side a first lens 3109, an aperture 3101, a second lens 3103, a protective plate 3105 and an image surface 3107 are disposed. The entry surface of the second lens 3103 (the object side surface) is shaped such that the surface is convex to the object side in the paraxial area. Although not shown in FIG. 17, the exit surface of the second lens 3103 is shaped as a Fresnel lens. The straight line which passes through the center of the aperture 3101 and the center of the second lens 3103 and is perpendicular to the plane of the aperture 3101 is designated as the optical axis.

Along the optical axis, the thickness of the first lens 3109 at the center is represented as ts1, the distance between the exit side of the first lens 3109 and the aperture 3101 is represented as ts2, the distance between the aperture 3101 and the entry surface of the second lens 3103 is represented as t0, the thickness of the second lens 3103 at the center is represented as t1, and the distance between the second lens 3103 and the image surface 3107 is represented as t2. The thickness of the second lens 3103 in the optical axis direction at the periphery of the effective aperture is represented as Et. Further, the diameter of the entrance pupil is represented as EPD while the focal length of the optical system is represented as f. The both sides of the protective plate 3105 are planar, and the thickness of the plate is 0.625 mm.

Table 6 shows measurements of the infrared imaging system according to Example 3.

TABLE 6

| | |
|---|---|
| ts1 | 0.500 |
| ts2 | 0.000 |
| t0 | 0.570 |
| t1 | 0.250 |
| t2 | 1.162 |
| Et | 0.158 |
| EPD | 1.000 |
| f | 0.501 |

In the present example, the ratio t1/EPD of the thickness of the lens at the center to the diameter of the entrance pupil is 0.25.

In the present example, the ratio t0/f of the distance t0 between the aperture 3101 and the entry surface of the second lens 3103 to the focal length f is 1.137.

Table 7 shows values of the coefficients of Equation (1) representing the exit surface of the first lens 3109. The entry surface of the first lens 3109 is planar while the exit surface is spherical. The material of the first lens 3109 is silicon, refractive index of which is 3.42 (at wavelength of 8 μm).

TABLE 7

| | Exit surface |
|---|---|
| R | −9.5 |
| c | −0.1053 |
| k | 0 |
| A2~A10 | 0 |

Table 8 shows values of the coefficients of Equation (1) representing the entry surface and the exit surface of the second lens 3103. The entry surface of the second lens 3103 is aspherical while the base lens shape and the Fresnel lens shape of the exit surface are also aspherical.

TABLE 8

| | Entry surface | Exit surface (base) | Exit surface (Fresnel) |
|---|---|---|---|
| R | 49.825 | −0.174 | 0.639 |
| C | 0.020 | −5.749 | 1.566 |
| K | −1.000 | −5.000 | −2.000 |
| A2 | 0.000 | 0.000 | 0.000 |
| A4 | 2.412 | 0.888 | −4.219 |
| A6 | −11.075 | 4.333 | 4.646 |
| A8 | 24.204 | −12.362 | −1.724 |
| A10 | −25.926 | 10.620 | 0.000 |

The shape of the exit surface is determined by the sum of the sag of the base lens and the sag of the Fresnel lens. In the present example, values of pitch are determined such that values of step height are made invariant.

Table 9 shows values of step height and pitch of the exit surface provided with a Fresnel lens surface.

TABLE 9

| Circular zone | Pitch [mm] | Step height [mm] |
|---|---|---|
| 0 | 0.460 | — |
| 1 | 0.071 | 0.05 |
| 2 | 0.050 | 0.05 |
| 3 | 0.043 | 0.05 |
| 4 | 0.037 | 0.05 |

TABLE 9-continued

| Circular zone | Pitch [mm] | Step height [mm] |
|---|---|---|
| 5 | 0.035 | 0.05 |
| 6 | 0.032 | 0.05 |
| 7 | 0.032 | 0.05 |
| 8 | 0.031 | 0.05 |
| 9 | 0.031 | 0.05 |
| 10 | 0.031 | 0.05 |
| 11 | 0.031 | 0.05 |
| 12 | 0.031 | 0.05 |
| 13 | 0.030 | 0.05 |
| 14 | 0.006 | 0.05 |

The maximum angle of view in full angle of the infrared imaging system according to Example 3 is 80°. The function of the second lens 3103 will be described below.

Figure 18:
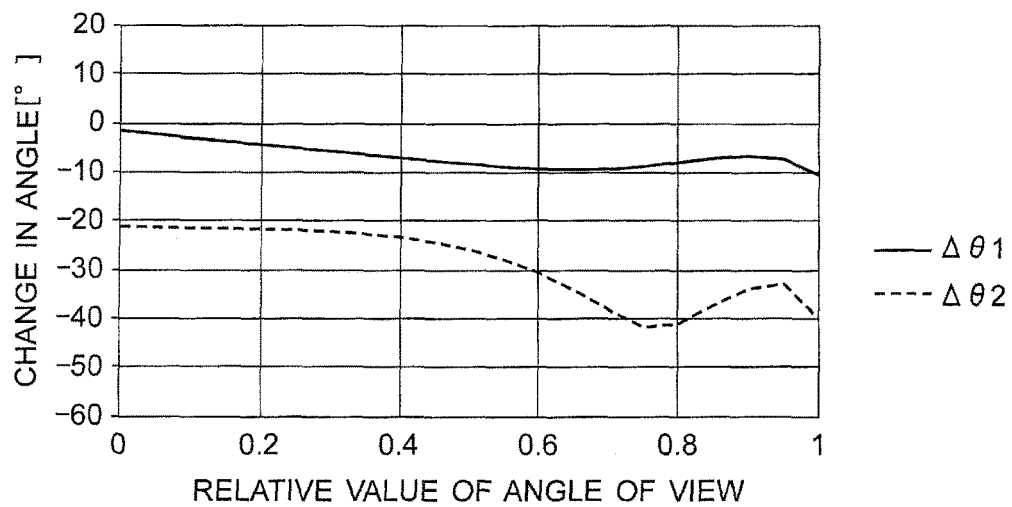
FIG. 18 shows relationships between relative value of angle of view and changes in angle of the upper ray at the entry surface and at the exit surface in the infrared imaging system according to Example 3 in accordance with an embodiment of the disclosure.

FIG. 18 shows relationships between relative value of angle of view and changes in angle of the upper ray at the entry surface and at the exit surface in the infrared imaging system according to Example 3. The horizontal axis in FIG. 18 represents relative value of angle of view. The relative value of angle of view is the value obtained by dividing an angle of view by the maximum angle of view, and is an absolute number. The vertical axis in FIG. 18 represents changes in angle $\Delta\theta1$ and $\Delta\theta2$. $\Delta\theta1$ and $\Delta\theta2$ represent values of changes in angle of a ray which enters the second lens 3103 with a predetermined angle of view, respectively at the entry surface and the exit surface, and can be expressed by the following equations.

$$\Delta\theta1=\theta1-\theta0$$

$$\Delta\theta2=\theta2-\theta1$$

For the upper ray, a positive value of change in angle corresponds to a negative refractive power (which diffuses rays), while a negative value of change in angle corresponds to a positive refractive power (which makes rays converge). For angles of view from 0 to the maximum angle of view, the entrance surface and the exit surface have positive refractive power. At the entrance surface, the positive refractive power increases with increase in angle of view when angle of view is smaller than 0.6. As a result, the refractive power of the exit surface can be reduced to a relatively small value, and therefore the lens thickness can be reduced by reducing the sag of the exit surface. Further, for the angle of view in the range from 0.7 to 0.8, the refractive power of the entry surface becomes weaker, while the refractive power of the exit surface increases. As a result, the converging angle at the image surface increases.

Figure 19:
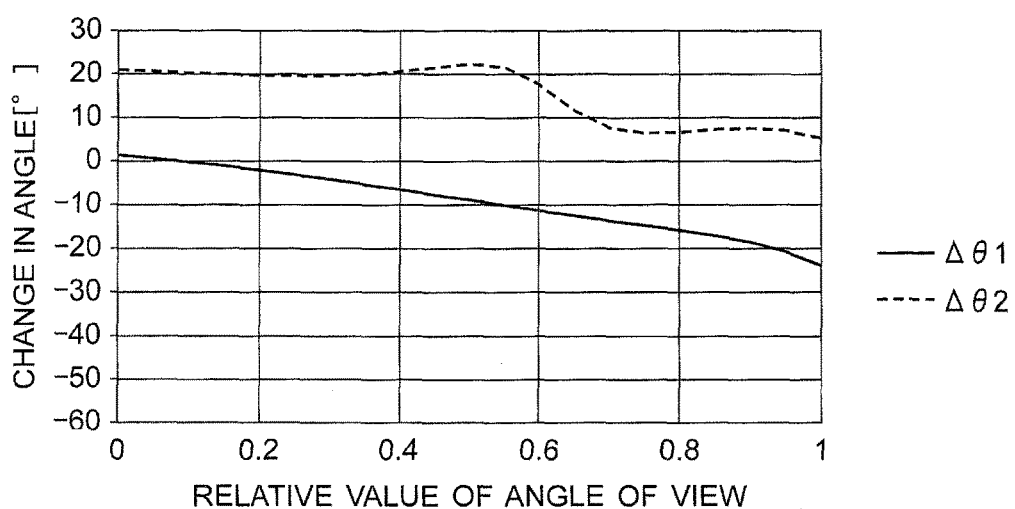
FIG. 19 shows relationships between relative value of angle of view and changes in angle of the lower ray at the entry surface and at the exit surface in the infrared imaging system according to Example 3 in accordance with an embodiment of the disclosure.

FIG. 19 shows relationships between relative value of angle of view and changes in angle of the lower ray at the entry surface and at the exit surface in the infrared imaging system according to Example 3. The horizontal axis in FIG. 19 represents relative value of angle of view. The vertical axis in FIG. 19 represents changes in angle $\Delta\theta1$ and $\Delta\theta2$.

For the lower ray, a negative value of change in angle corresponds to a negative refractive power (which diffuses rays), while a positive value of change in angle corresponds to a positive refractive power (which makes rays converge). When the angle of view is lower, the entrance surface and the exit surface have positive refractive power, and therefore the focal length of the lens becomes smaller and the F-number becomes smaller. With increase of the angle of view, the refractive power of the entry surface becomes negative and the absolute value of the negative refractive power increases. As a result, the refractive power of the exit surface becomes relatively great, and therefore the converging angle at the image surface for greater angles of view becomes greater.

Figure 20:
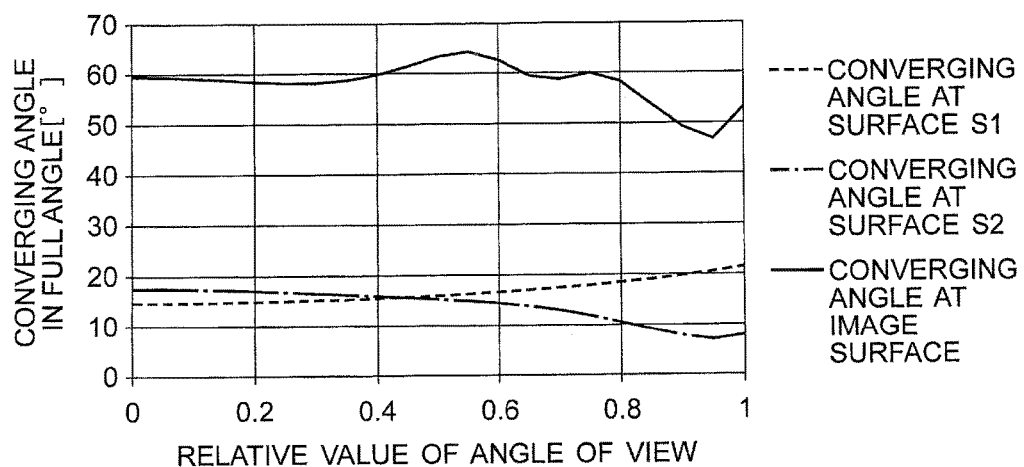
FIG. 20 shows relationships between relative value of angle of view and converging angles in full angle in the infrared imaging system according to Example 3 in accordance with an embodiment of the disclosure.

FIG. 20 shows relationships between relative value of angle of view and converging angles in full angle in the infrared imaging system according to Example 3. The horizontal axis in FIG. 20 represents relative value of angle of view while the vertical axis represents converging angles in full angle at the entry surface (surface S1), the exit surface (surface S2) and the image surface. According to FIG. 20, the converging angle in full angle at the image surface is 45° or greater for all angles of view, and the converging angle in full angle at the image surface is 50° or greater for 80% or more of the range of angle of view. Further, the converging angle in full angle for the angle of view of 0 degree, that is, the converging angle on the optical axis is 60°, and the F-number is 0.501.

Figure 21:
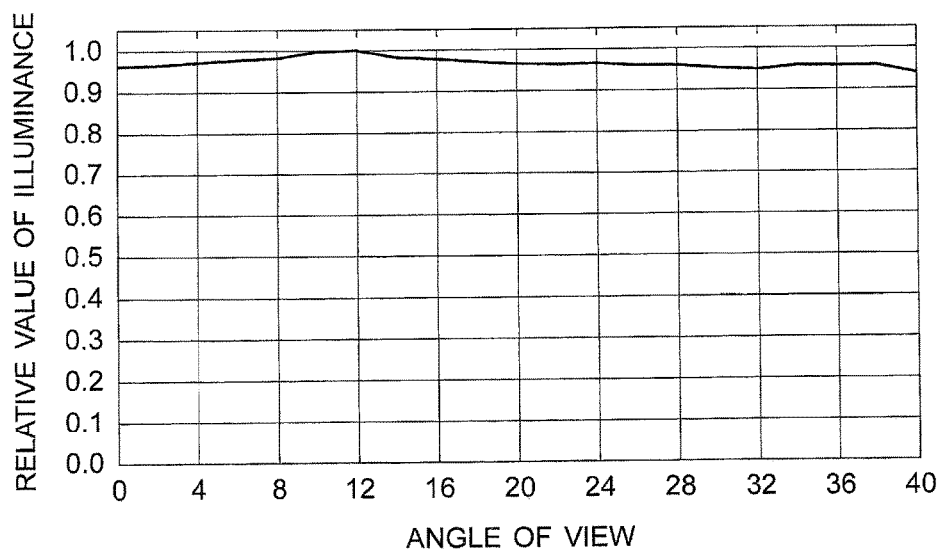
FIG. 21 shows a relationship between angle of view and relative value of illuminance in the infrared imaging system according to Example 3 in accordance with an embodiment of the disclosure. In accordance with an embodiment of the disclosure.

FIG. 21 shows a relationship between angle of view and relative value of illuminance in the infrared imaging system according to Example 3. The horizontal axis in FIG. 21 represents angle of view while the vertical axis represents relative value of illuminance. The relative value of illuminance is the value which is obtained by dividing a value of illuminance by the maximum value of illuminance, and is an absolute value. Illuminance shows the maximum value when the angle of view is approximately 12°. According to FIG. 21, the relative values of illuminance is 0.9 or greater for all angles of view.

Comparative Example 1

Figure 22:
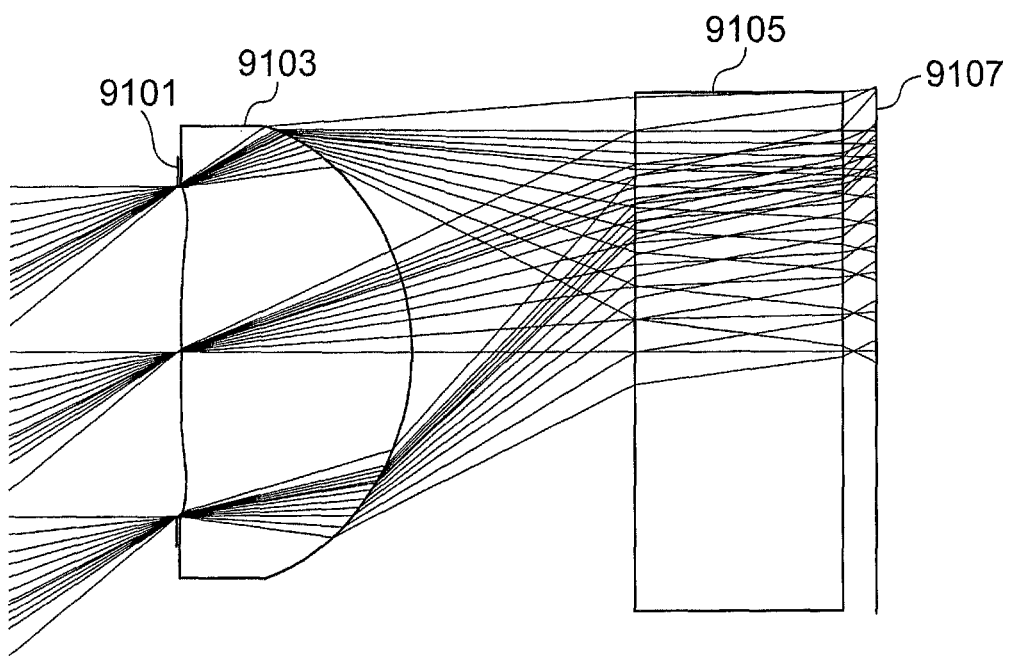
FIG. 22 shows a construction of an infrared imaging system according to Comparative Example 1.

FIG. 22 shows a construction of an infrared imaging system according to Comparative Example 1. In the infrared imaging system, from the object side to the image side an aperture 9101, a lens 9103, a protective plate 9105 and an image surface 9107 are disposed. The straight line which passes through the center of the aperture 9101 and the center of the lens 9103 and is perpendicular to the plane of the aperture 9101 is designated as the optical axis. The lens 9103 is made of high-density polyethylene while the protective plate 9105 is made of silicon.

The lens 9103 is designed such that the entry surface is concave and the exit surface is convex in accordance with general design of a single-lens imaging system used in the range of visible lights.

Along the optical axis, the distance between the aperture 9101 and the entry surface of the lens 9103 is represented as t0, the thickness of the lens 9103 at the center is represented as t1, and the distance between the lens 9103 and the image surface 9107 is represented as t2. The thickness of the lens 9103 in the optical axis direction at the periphery of the effective aperture is represented as Et. Further, the diameter of the entrance pupil is represented as EPD while the focal length of the optical system is represented as f. The both sides of the protective plate 9105 are planar, and the thickness of the plate is 0.625 mm.

Table 10 shows measurements of the infrared imaging system according to Comparative Example 1.

TABLE 10

| t0 | 0.012 |
| t1 | 0.697 |
| t2 | 1.395 |
| Et | 0.421 |
| EPD | 1.000 |
| F | 1.647 |

In the present example, the ratio t1/EPD of the thickness t1 of the lens at the center to the diameter of the entrance pupil EPD is 0.697.

In the present example, the ratio t0/f of the distance t0 between the aperture 9101 and the entry surface of the lens 9103 to the focal length f is 0.00729.

Table 11 shows values of the coefficients of Equation (1) representing the entry surface and the exit surface of the lens 9103. The entry surface and the exit surface of the lens 9103 are aspherical

TABLE 11

|  | Entry surface | Exit surface |
| --- | --- | --- |
| R | −11.410 | −0.798 |
| c | −0.088 | −1.252 |
| k | −10.000 | 0.279 |
| A2 | 0.000 | 0.000 |
| A4 | 2.454 | −0.123 |
| A6 | −9.970 | 1.467 |
| A8 | 0.000 | −3.931 |
| A10 | 14.456 | 4.118 |

The maximum angle of view in full angle of the infrared imaging system for visible lights according to Comparative Example 1 is 80°. The function of the lens 9103 will be described below.

Figure 23:
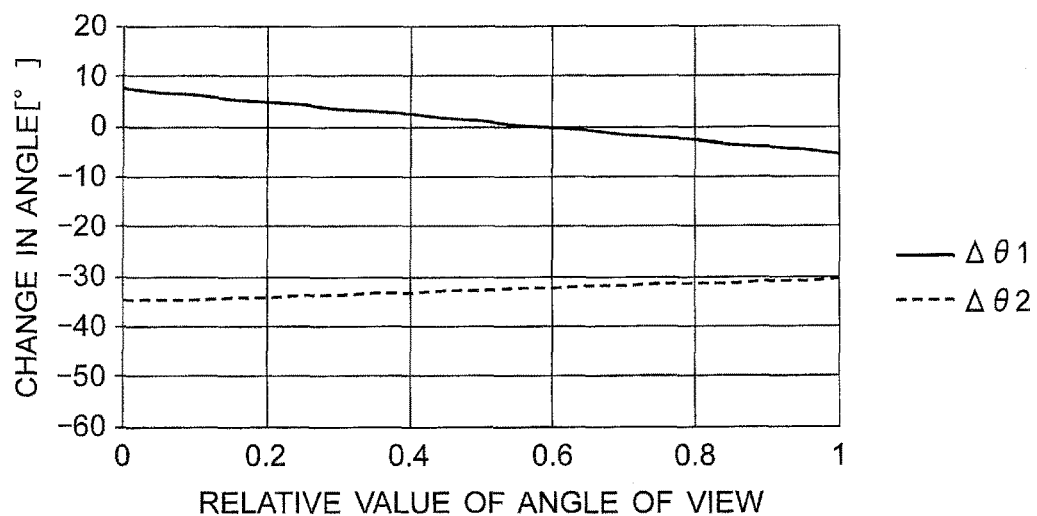
FIG. 23 shows relationships between relative value of angle of view and changes in angle of the upper ray at the entry surface and at the exit surface in the infrared imaging system according to Comparative Example 1.

FIG. 23 shows relationships between relative value of angle of view and changes in angle of the upper ray at the entry surface and at the exit surface in the infrared imaging system according to Comparative Example 1. The horizontal axis in FIG. 23 represents relative value of angle of view. The relative value of angle of view is the value obtained by dividing an angle of view by the maximum angle of view, and is an absolute number. The vertical axis in FIG. 23 represents changes in angle $\Delta\theta 1$ and $\Delta\theta 2$. $\Delta\theta 1$ and $\Delta\theta 2$ represent values of changes in angle of a ray which enters the lens 9103 with a predetermined angle of view, respectively at the entry surface and at the exit surface, and can be expressed by the following equations.

$$\Delta\theta 1 = \theta 1 - \theta 0$$

$$\Delta\theta 2 = \theta 2 - \theta 1$$

For the upper ray, a positive value of change in angle corresponds to a negative refractive power (which diffuses rays), while a negative value of change in angle corresponds to a positive refractive power (which makes rays converge). For relative angles of view in the range from 0 to 0.6, change in angle at the entry surface is positive, and the entry surface has a negative refractive power. As a result, the focal length of the lens 9103 becomes greater, and the F-number increases. For relative angles of view in the range of 0.6 or greater, the entry surface has a positive refractive power. As a whole, however, the positive refractive power is achieved by the exit surface. As a result, the curvature of the exit surface becomes greater, and therefore the sag of the surface increases. Although the lens thickness is substantially equal to that of Example 1, the inclination of the exit surface at the edge is 70° or greater. Further, since the positive refractive power is substantially achieved by the exit surface alone, a sufficient convergence power cannot be obtained, and therefore the converging angle and relative value of illuminance at the periphery of the image surface decrease.

Figure 24:
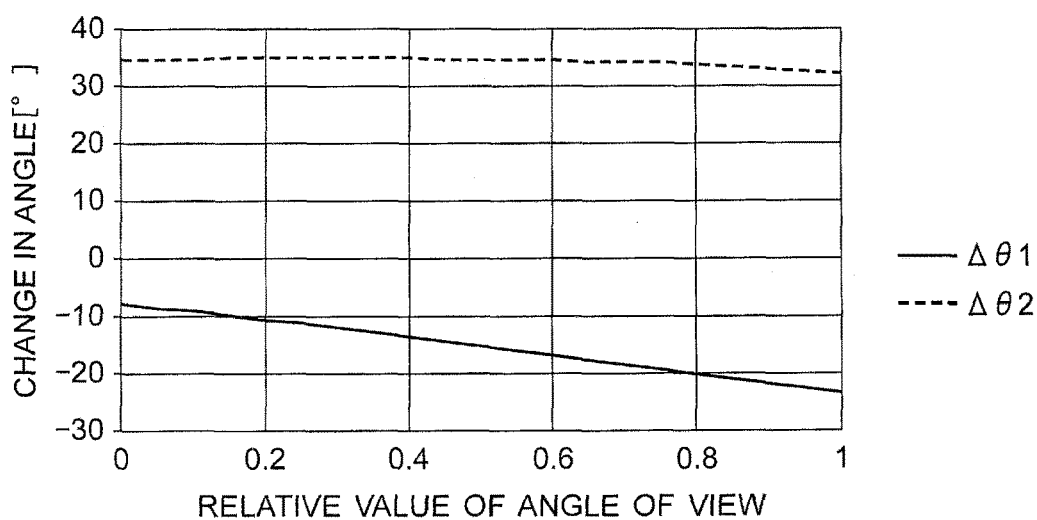
FIG. 24 shows relationships between relative value of angle of view and changes in angle of the lower ray at the entry surface and at the exit surface in the infrared imaging system according to Comparative Example 1.

FIG. 24 shows relationships between relative value of angle of view and changes in angle of the lower ray at the entry surface and at the exit surface in the infrared imaging system according to Comparative Example 1. The horizontal axis in FIG. 24 represents relative value of angle of view. The vertical axis in FIG. 24 represents changes in angle Δθ1 and Δθ2.

For the lower ray, a negative value of change in angle corresponds to a negative refractive power (which diffuses rays), while a positive value of change in angle corresponds to a positive refractive power (which makes rays converge).

Figure 25:
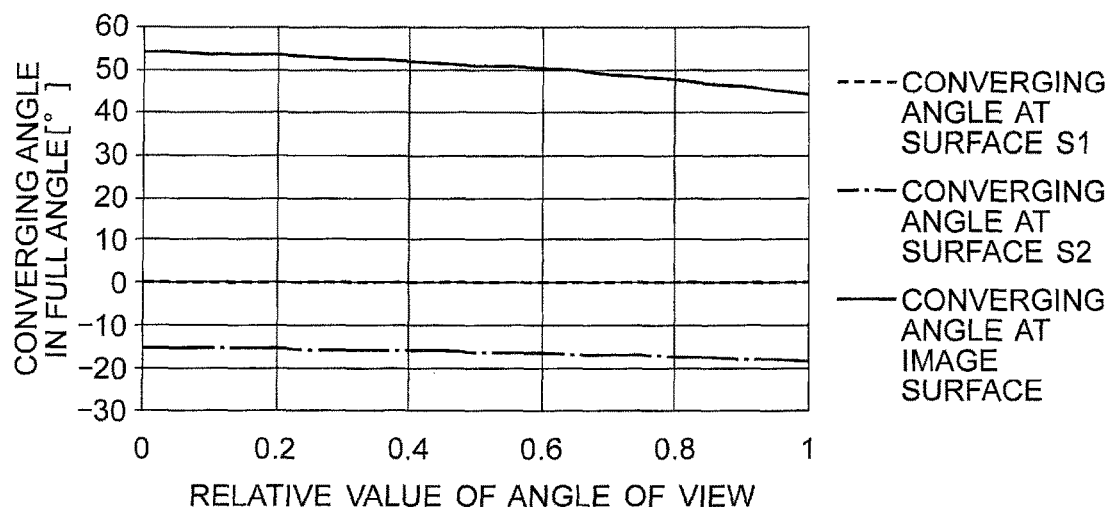
FIG. 25 shows relationships between relative value of angle of view and converging angles in full angle in the infrared imaging system according to Comparative Example 1.

FIG. 25 shows relationships between relative value of angle of view and converging angles in full angle in the infrared imaging system according to Comparative Example 1. The horizontal axis in FIG. 25 represents relative value of angle of view while the vertical axis represents converging angles in full angle at the entry surface (surface S1), the exit surface (surface S2) and the image surface. According to FIG. 25, the converging angle in full angle for the angle of view of 0 degree, that is, the converging angle on the optical axis is 53.9°, and the F-number is 1.647.

Figure 26:
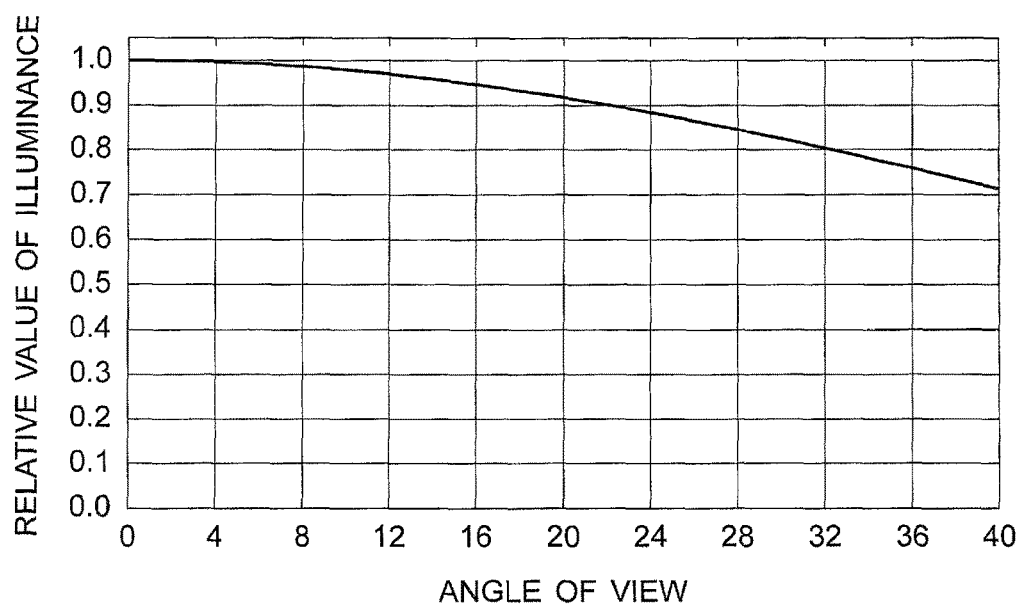
FIG. 26 shows a relationship between angle of view and relative value of illuminance in the infrared imaging system according to Comparative Example.

FIG. 26 shows a relationship between angle of view and relative value of illuminance in the infrared imaging system according to Comparative Example 1. The horizontal axis in FIG. 26 represents angle of view while the vertical axis represents relative value of illuminance. The relative value of illuminance is the value which is obtained by dividing a value of illuminance by the maximum value of illuminance, and is an absolute value. Illuminance shows the maximum value when the angle of view is 0. According to FIG. 26, the relative value of illuminance decreases with increase of angle of view, and the relative value of illuminance is 0.72 when the angle of view is 40°.

Comparison of Examples 1 to 3 with Comparative Example

The F-numbers of Examples 1 to 3 are 1.1 or smaller while the F number of Comparative Example is 1.64. In general, F-number of 1.4 or smaller assures sufficient brightness for use with infrared rays. The converging angles in full angle of Examples 1 to 3 are 57° or greater while the converging angle in full angle of Comparative Example is 53.9°. The converging angles in full angle of Examples 1 to 3 are 50° or greater in 80% or more of the range of angle of view from 0 to the maximum angle of view while the converging angle in full angle of Comparative Example is smaller than 50° in 35% or more of the range of angle of view from 0 to the maximum angle of view.

The relative values of illuminance at the image surface of Examples 1 to 3 are 0.8 or greater in the whole range of angle of view from 0 to the maximum angle of view while the relative value of illuminance at the image surface of Comparative Example 1 is smaller than 0.8 in 20% of the range of angle of view from 0 to the maximum angle of view.

Thus embodiments of the present disclosure provide an imaging system with a smaller F-number in which brightness is maintained in the range of angle of view from 0 to the maximum angle of view.

In the descriptions of Examples 1 to 3 values of the maximum angle of view in full angle are 60° or greater. In general, an optical system for a greater value of the maximum angle of view can be used for an optical system for a smaller value of the maximum angle of view. Accordingly, embodiments of the present disclosure can be applied to an optical system for a smaller value of the maximum angle of view, for example, for a standard optical system with angle of view of 45°.

Embodiments described above illustrate but do not limit the invention. It should also be understood that numerous modifications and variations are possible in accordance with the principles of the invention. Accordingly, the scope of the invention is defined only by the following claims.

What is claimed is:

1. An infrared imaging system comprising:
an aperture configured to receive infrared radiation having wavelengths of 5 micrometers or greater from an object;
an imaging element;
a single synthetic resin lens disposed between the aperture and the imaging element and configured to pass the infrared radiation to the imaging element, wherein the synthetic resin lens comprises an object side surface and an image side surface, wherein the object side surface comprises a convex entry surface in a paraxial area;
wherein the imaging element is configured to receive the infrared radiation from the image side surface of the synthetic resin lens without another lens disposed between the aperture and the imaging element; and
wherein the system exhibits an F-number of 1.4 or smaller.

2. The infrared imaging system of claim 1, wherein the synthetic resin lens comprises high-density polyethylene.

3. The infrared imaging system of claim 1, wherein the image side surface comprises a Fresnel lens surface.

4. The infrared imaging system of claim 1, wherein a ratio of a thickness of the synthetic resin lens at its center to a diameter of the aperture is 0.683 or smaller.

5. The infrared imaging system of claim 1, wherein the object side surface exhibits a positive curvature, a negative conic constant, and at least one negative aspheric coefficient.

6. The infrared imaging system of claim 1, wherein the synthetic resin lens is configured to provide a converging angle of 50 degrees or greater over at least 80 percent of a range of angles of view for the system.

7. The infrared imaging system of claim 6, wherein the range of angles of view is 60 degrees or greater.

8. The infrared imaging system of claim 1, wherein the synthetic resin lens is configured to provide a range of relative values of illuminance greater than 0.8 over a range of angles of view for the system.

9. The infrared imaging system of claim 8, wherein the range of angles of view is 60 degrees or greater.

10. The infrared imaging system of claim 1, wherein the synthetic resin lens provides a majority of a total refractive power associated with the system.

* * * * *